US007229171B2

(12) United States Patent
Dietz

(10) Patent No.: US 7,229,171 B2
(45) Date of Patent: Jun. 12, 2007

(54) REMOVABLE EYEGLASSES CLASP

(75) Inventor: Dan L. Dietz, Houston, TX (US)

(73) Assignee: Gripping Eyewear, Inc., Houston, TX (US)

(*) Notice: Subject to any disclaimer, the term of this patent is extended or adjusted under 35 U.S.C. 154(b) by 0 days.

(21) Appl. No.: 11/196,032

(22) Filed: Aug. 3, 2005

(65) Prior Publication Data

US 2006/0055869 A1   Mar. 16, 2006

Related U.S. Application Data

(60) Provisional application No. 60/599,642, filed on Aug. 6, 2004.

(51) Int. Cl.
G02C 5/14 (2006.01)
(52) U.S. Cl. .............................. 351/112; 351/63; 24/3.3
(58) Field of Classification Search ................. 351/41, 351/63, 111, 112, 156–158; 2/452, 454; 24/3.3; 206/5
See application file for complete search history.

(56) References Cited

U.S. PATENT DOCUMENTS

| 1,898,059 A | 2/1933 | McDonald |
| 1,973,648 A | 9/1934 | Nagel |
| 3,498,701 A | 3/1970 | Miller |
| 3,531,188 A | 9/1970 | LeBlanc et al. |
| 3,565,517 A | 2/1971 | Gitlin et al. |
| 3,582,192 A | 6/1971 | Gitlin et al. |
| 3,838,914 A | 10/1974 | Fernandez |
| 4,050,785 A | 9/1977 | Auge |
| 4,070,103 A | 1/1978 | Meeker |
| 4,196,981 A | 4/1980 | Waldrop |
| 4,316,654 A | 2/1982 | Allen |
| 4,496,224 A | 1/1985 | Allen |
| 4,541,125 A | 9/1985 | Phillips |
| 4,662,729 A | 5/1987 | Dobson |

(Continued)

FOREIGN PATENT DOCUMENTS

CN       2510884 Y      9/2002

(Continued)

OTHER PUBLICATIONS

The translation of the Japanese document: JP 11-64804 (publication date: 1999).*

Primary Examiner—Huy Mai
(74) Attorney, Agent, or Firm—Fulbright & Jaworski LLP; Jan K. Simpson

(57) ABSTRACT

The present invention is directed to a removable magnetic clasp for eyeglasses. The eyeglasses have a right temple bar and a left temple bar pivotally attached to an eyeglasses frame body. The magnetic clasp comprises: a first connector and a second connector; a first magnet being positioned on the first connector and a second magnet being positioned on the second connector. A channel extends through a portion of each connector and the channel is configured to so as to allow a temple bar to slide through the channel. The removable magnetic clasp, when attached to eyeglasses, allows for the first and second magnets to remain in attractive magnetic communication when the temple bars are closed but separated by clothing material, the attractive magnetic communication imparting a gripping force on the clothing material sufficient enough to substantially prevent relative movement between the temple bars and the clothing material.

40 Claims, 3 Drawing Sheets

U.S. PATENT DOCUMENTS

| | | |
|---|---|---|
| 4,747,183 A | 5/1988 | Drlik |
| 4,771,515 A | 9/1988 | Guarro |
| 4,809,406 A | 3/1989 | Tsai |
| 4,903,375 A | 2/1990 | DiFranco |
| 4,946,125 A | 8/1990 | McCarty |
| 4,949,432 A | 8/1990 | Wisniewski |
| 5,005,263 A | 4/1991 | Barrett |
| 5,018,242 A | 5/1991 | Guy et al. |
| 5,123,724 A | 6/1992 | Salk |
| 5,235,727 A | 8/1993 | McCloskey |
| 5,328,411 A | 7/1994 | Thornton, II |
| 5,351,098 A | 9/1994 | McDaniels et al. |
| 5,355,184 A | 10/1994 | Varveris et al. |
| 5,372,345 A | 12/1994 | Schmidt |
| 5,389,981 A | 2/1995 | Riach, Jr. |
| 6,145,167 A | 11/2000 | Brentini |
| 6,168,273 B1 | 1/2001 | Dupraz et al. |
| 6,425,664 B1 | 7/2002 | Liu et al. |
| 6,568,805 B1 | 5/2003 | Dietz |
| 6,848,787 B2 | 2/2005 | Dietz |
| 6,899,423 B1 * | 5/2005 | Brazell ........................ 351/157 |
| D519,542 S * | 4/2006 | Goodman .................. D16/339 |

FOREIGN PATENT DOCUMENTS

| | | |
|---|---|---|
| EP | 0 385 002 B1 | 5/1995 |
| JP | S53-124455 | 10/1978 |
| JP | 9-933865 | 2/1997 |
| JP | 11-64804 | 3/1999 |
| JP | U3097213 | 8/2003 |

* cited by examiner

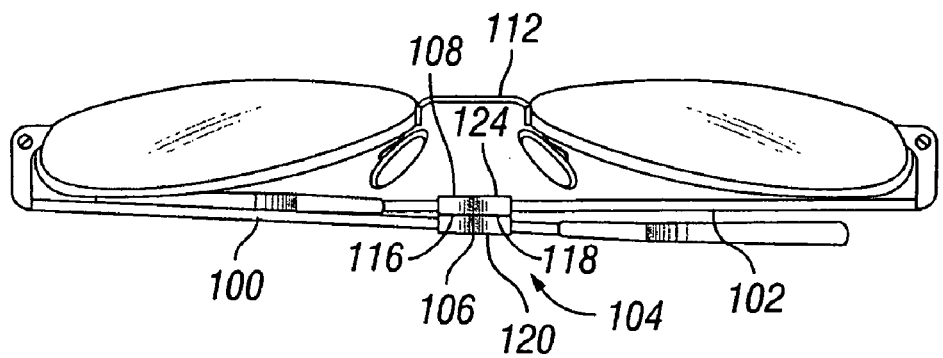
FIG. 3
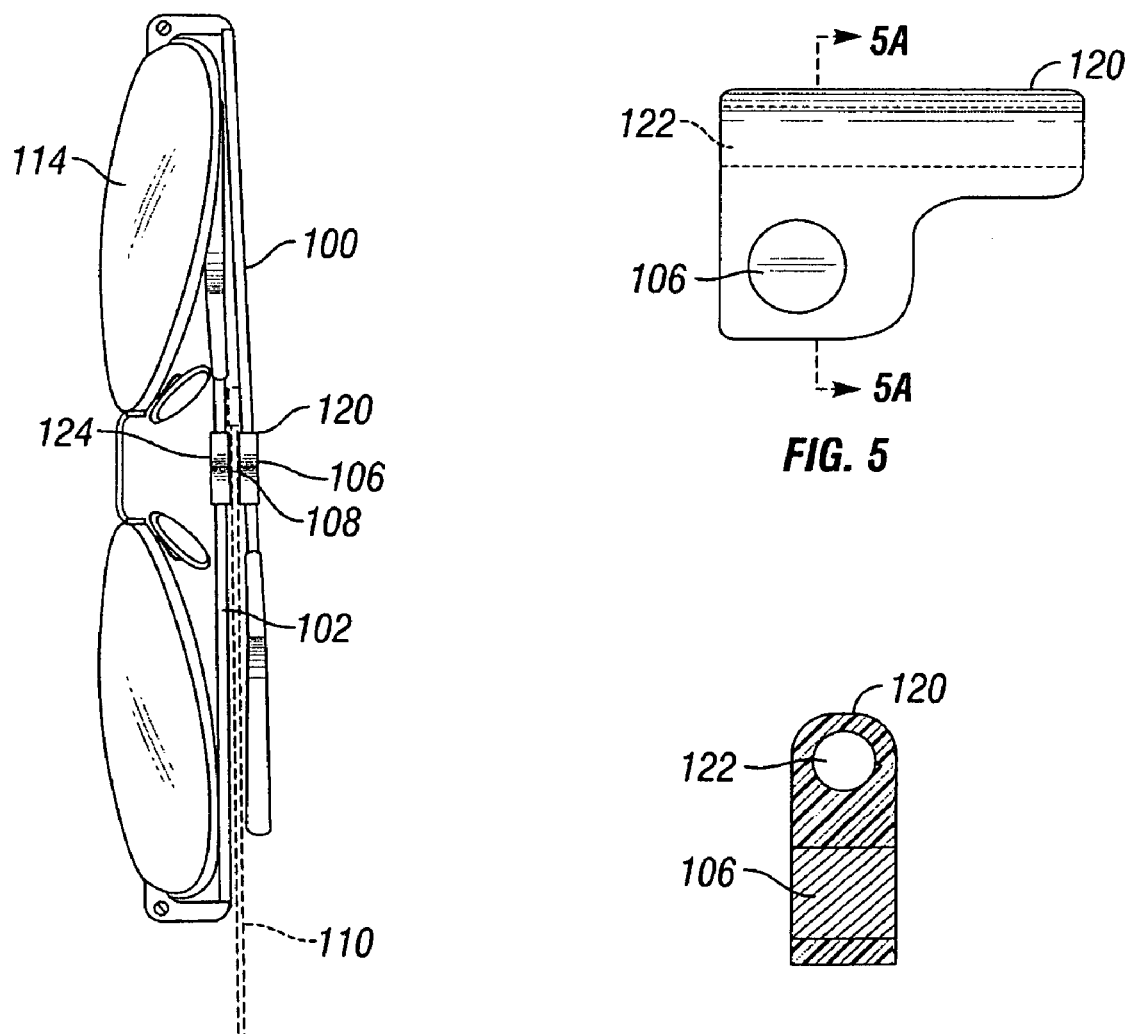
FIG. 4
FIG. 5
FIG. 5A

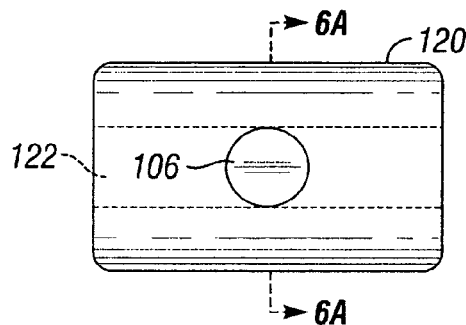
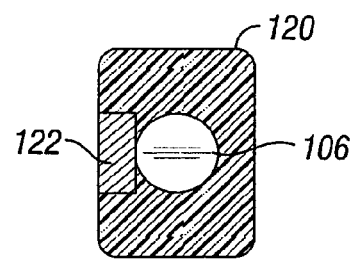
FIG. 6
FIG. 6A
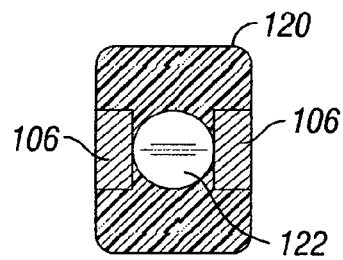
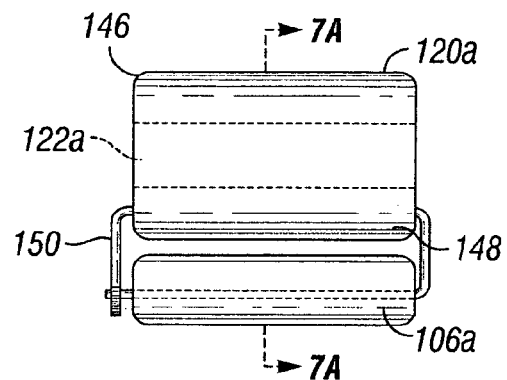
FIG. 6B
FIG. 7
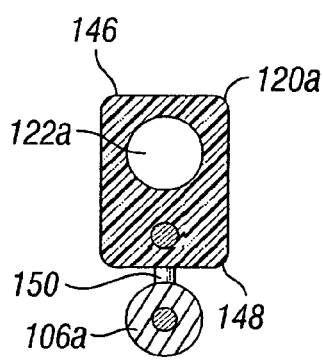
FIG. 7A
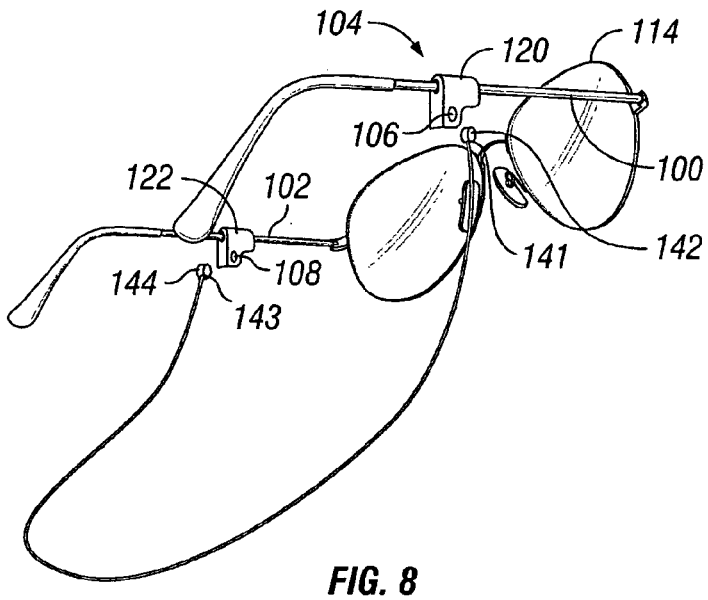
FIG. 8

REMOVABLE EYEGLASSES CLASP

CROSS-REFERENCE TO RELATED APPLICATIONS

This application claims priority to U.S. Provisional Application Ser. No. 60/599,642 filed Aug. 6, 2004.

TECHNICAL FIELD

The present invention relates to an eyeglasses clasp. More particularly, it relates to a removable magnetic eyeglasses clasp for maintaining the eyeglasses in a pocket or on another portion of a clothing material when the eyeglasses are not in use.

BACKGROUND OF THE INVENTION

Typical eyeglasses consist of a frame body that houses two lenses on either side of a nose piece. Attached to the frame body are two temple bars that extend from two ends of the frame body. The temple bars pivot between an open position perpendicular with the frame body and a closed position parallel with the frame body. Sometimes attached to the temple bars are separate ear pieces, or temple tips. The temple bars and nose piece support the frame on the head of the wearer.

Individuals often remove their eyeglasses temporarily. They may put them down and not recall where, they may hang them around their neck where they bounce against their chest, or they may put them in a pocket and have them fall out and/or get damaged.

To solve this problem, the prior art teaches using mechanical clasps to clip eyeglasses to a garment worn by the user. These are cumbersome and, like all mechanical clasps, may come loose. Some mechanical clasps also depend on the availability of a shirt pocket, a cap visor, belt, holder, straps, or the like. In addition, clips may work well initially, but fatigue can cause metal clips to weaken and lose their ability to hold eyeglasses securely. Moreover, clips can break, thereby causing the eyeglasses to come loose, fall and break, or be lost. U.S. Pat. No. 6,017,120 to McCormick teaches a mechanical clip attached to the hinged end of the temple bars. Eyeglasses using such mechanical clips may not be securely held in place when inverted, such as when a person bends over at the waist. Another problem with such clips arises when a person in a sitting position bends forward, and the eyeglasses are pushed upward while clasped inside a shirt pocket. In that situation, the clip may be pushed up from the bottom of the pocket, thereby disengaging the clip and causing the eyeglasses to fall from the pocket.

The use of magnets on eyeglass frames for various purposes is also well known in the art. For example, a number of eyeglass frames have magnets that magnetize the wearer for health benefits. Other eyeglass frames use magnets to hold eyeglass frame sections together, thereby facilitating disassembly and reassembly in a new configuration, with auxiliary frames, lenses, or the like. U.S. Pat. No. 6,168,273 B11 to Dupraz et al. teaches the use of magnets on eyeglass frames to temporarily affix the eyeglasses on a support article having magnetic means. Because the magnets in Dupraz et al. are attached to the temple bar near the hinges, however, its teaching cannot be used as a magnetic clasp, nor was it intended as such.

It would be desirable to provide a removable magnetic eyeglasses clasp that could be easily attached to eyeglasses frames that would provide a gripping force on clothing material sufficient enough to substantially prevent relative movement between the temple bars and the clothing material.

BRIEF SUMMARY OF THE INVENTION

The present invention is directed to a removable magnetic clasp for eyeglasses. The eyeglasses have a right temple bar and a left temple bar pivotally attached to an eyeglasses frame body. The magnetic clasp comprises: a first connector and a second connector; a first magnet being positioned on the first connector and a second magnet being positioned on the second connector. A channel extends through a portion of each connector and the channel is configured to so as to allow a temple bar to slide through the channel. The removable magnetic clasp, when attached to eyeglasses, allows for the first and second magnets to remain in attractive magnetic communication when the temple bars are closed but separated by clothing material, the attractive magnetic communication imparting a gripping force on the clothing material sufficient enough to substantially prevent relative movement between the temple bars and the clothing material.

The magnets are attached to the connectors by attachment means selected from a group consisting of injection molding, grooved means, adhesive means, shrink-wrap tubing, hinged clips, metal clamps, threaded hardware, and a combination thereof.

The connectors are formed from a deformable material.

The shape of the magnets can be circular, square, rectangular, cylindrical and triangular shapes.

The removable clap further comprises an eyeglass necklace having a first necklace magnet attached to a first end and a second necklace magnet attached to a second end. The first necklace magnet attaches to the first magnet on the first connector by attractive magnetic communication and the second necklace magnet attaches to the second magnet on the second connector by attractive magnetic communication.

The necklace can be formed from material such as metal, plastic, rubber and neoprene.

The first and second necklace magnets are attached to the first and second necklace ends by adhesive or injection molding.

The present invention is also directed to a removable magnetic clasp eyeglasses kit. The kit comprises a first connector and a second connector, a first magnet being positioned on the first connector and a second magnet being positioned on the second connector, and a channel extending through a portion of each connector. The channel is configured so as to allow a temple bar to slide through the channel. The removable magnetic clasp, when attached to eyeglasses, allows for the first and second magnets to remain in attractive magnetic communication when temple bars of the eyeglasses are closed but separated by clothing material, the attractive magnetic communication imparting a gripping force on the clothing material sufficient enough to substantially prevent relative movement between the temple bars and the clothing material.

The kit further includes an eyeglass necklace having a first necklace magnet attached to a first end and a second necklace magnet attached to a second end; wherein the first necklace magnet attaches to the first magnet on the first connector by attractive magnetic communication and the second necklace magnet attaches to the second magnet on the second connector by attractive magnetic communication.

The present invention further is directed to a method of installing a removable magnetic eyeglasses clasp on eyeglasses. The method comprises the steps of: (1) providing eyeglasses having a right temple bar and a left temple bar pivotally attached to an eyeglasses frame; (2) providing a removable magnetic eyeglass clasp comprising a first connector and a second connector, a first magnet being positioned on the first connector and a second magnet being positioned on the second connector, and a channel extending through a portion of each connector, the channel being configured to so as to allow a temple bar to slide through the channel; (3) sliding a connector on each of the temple bars such that the polarity of the magnets directed outside the temple bars is the same; and (4) positioning the connectors on the temple bars so that the connectors align with each other when the temple bars are in the closed position.

BRIEF DESCRIPTION OF THE DRAWINGS

For a more details description of the embodiments, reference will now be made to the following accompanying drawings:

FIG. 3 is a bottom view of the eyeglasses incorporating a removable eyeglasses clasp with the temple bars pivoted into the closed position;

FIG. 4 is a bottom view of the eyeglasses incorporating a removable eyeglasses clasp with the temple bars pivoted in the closed position depicting use of the clasp with clothing material;

FIG. 5 is an elevation view of a connector of the removable eyeglasses clasp;

FIG. 5A is a cross-sectional view taken along line 5A—5A of FIG. 5;

FIG. 6 is an elevation view of an alternative connector of the removable eyeglasses clasp;

FIG. 6A is a cross-sectional view taken along line 6A—6A of FIG. 6 illustrating a magnet on one side;

FIG. 6B is an alternate cross-sectional of FIG. 6A illustrating a magnet on each side;

FIG. 7 is elevation view of an alternative connector of the removable eyeglasses clasp;

FIG. 7A is a cross-sectional view taken along line 7A—7A of FIG. 7; and

FIG. 8 is a perspective view of the removable eyeglasses clasp with an optional eyeglasses necklace.

DETAILED DESCRIPTION OF THE EMBODIMENTS

Figure 1:
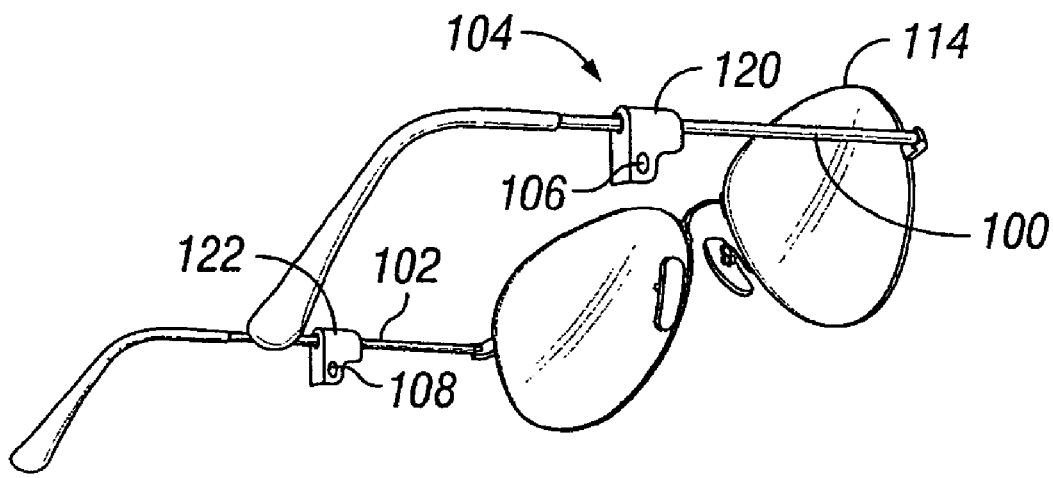
FIG. 1 is a perspective view of eyeglasses incorporating a removable eyeglasses clasp with temple bars pivoted in the open position as when the eyeglasses are worn.
Figure 2:
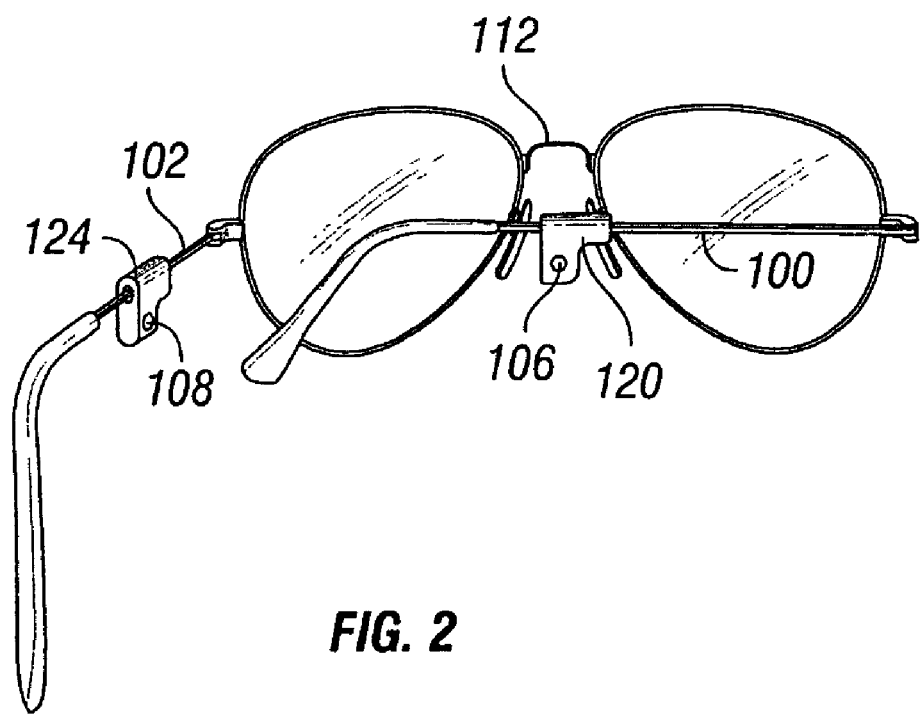
FIG. 2 is a perspective view of eyeglasses incorporating a removable eyeglasses clasp with one of the temple bars pivoted into the closed position.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Any use of any form of the terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

The removable eyeglasses clasp comprises magnets engaged with the temple bars of eyeglasses. The magnets are located approximately the same distance away from the eyeglass frame body on each temple bar such that they align with the frame body midpoint when in the closed position. The magnets are in attractive magnetic communication at least when the temple bars are in the closed position. The clasp include a channel extending through it that is large enough to slide the claps onto the temple bars of the eyeglasses.

The clasp is typically used by pivoting one of the temple bars into the closed position. The frame body and closed temple bar are then positioned on one side of a clothing material, such as, by way non-limiting example only, a shirt pocket or sleeve. The second temple bar is then pivoted into the closed position such that it is on the other side of the clothing material. The magnets are then in attractive magnetic communication and impart a gripping force on the clothing material. The gripping force substantially prevents relative movement between the temple bars and the clothing material. The magnetic clasp thereby eliminates the disadvantages of a mechanical clip while introducing the advantage of a strong, versatile clasp that can be easily opened and closed anywhere the magnets are capable of being in strong enough attractive magnetic communication through the clothing material.

FIGS. 1–8 illustrate an embodiment of the removable eyeglasses clasp 104. An eyeglasses frame body 114 comprises a right temple bar 100 and a left temple bar 102, typically pivotally attached by any suitable means. The temple bars 100, 102 may be pivotally attached with spring action hinges well known in the art. The temple bars 100, 102 pivot between an open position shown in FIG. 1 and a closed position shown in FIG. 3. In addition, the temple bars 100, 102 may comprise earpieces, or temple tips. The frame body 114 may also comprise a nose piece 112.

The removable eyeglasses clasp 104 further comprises a first connector 120 and a second connector 124. The connectors 120, 124 engage the temple bars by sliding each temple bar 100, 102 through a channel 122 in each of the connectors 120, 124. FIGS. 5 and 5A illustrate the channel 122 in connector 120.

The first connector 120 further includes a first magnet 106 and the second connector 124 includes a second magnet 108. The means for engaging the magnets 106, 108 to the connectors 120, 124 may depend on the material from which the magnets 106, 108 and the connectors 120, 124 are made. It should be appreciated that any suitable materials and method of attaching the magnets 106, 108 to the respective connectors 120, 124 may be used. Such attachment means for various materials may include grooved means, adhesive means, shrink-wrap tubing, hinged clips, metal clamps, threaded hardware, and the like, and/or a combination thereof. The magnets 106, 108 may also be injection molded into the connectors 120, 124. The magnets can be any shape, such as circular, square, rectangular, cylindrical or triangular in shape.

When engaged with the temple bars 100, 102, the polarity of the magnets 106, 108 directed outside the temple bars 100, 102 shown in FIG. 1 is the same. The connectors 120, 124 engage the temple bars 100, 102 such that the magnets 106, 108 align with each other when the temple bars 100, 102 are in the closed position. Thus, as illustrated in FIG. 3, when temple bars 100, 102 are pivoted closed, the magnets 106, 108 are in attractive magnetic communication created by the opposite poles of the magnets 106, 108. FIG. 3 illustrates left temple bar 102 folded on the inside of right temple bar 100. The south pole side 116 of the magnet 106 thus faces and aligns with the north pole side 118 of the magnet 108, thereby holding the temple bars 100, 102 securely in the closed position. The magnets need not be offset as illustrated in FIGS. 1–5A, but may also be located more in-line with the temple bars 100, 102 as illustrated in FIGS. 6, 6A and 6B. FIG. 6A illustrates the connector 120 with a magnet 106 on one side of the connector and FIG. 6B illustrates the connector 120 with a magnet 106 on each side of the connector.

In an alternative embodiment as illustrated in FIGS. 7, 7A, a removable eyeglasses clasp 104a comprises a first 120a and second connector 124a (second connector 124a not shown as it is identical to connector 120a) generally square in shape. The connectors 120a, 124a engage the temple bars 100, 102 by sliding the temple bars into a channel 122a in each of the connectors. The connectors 120a, 124a have a first end 146 and a second end 148 in which a cylindrical magnet 106a, 108a (magnet 108a is not shown) is attached to the second end of each connector 120a, 124a. In a preferred embodiment, the magnets 106a, 108a are the same length as the second ends 148 of the connectors 120a, 124a. The means 150 for engaging the magnets 106a, 108a to the connectors 120a, 124a may depend on the material from which the magnets 106a, 108a and the connectors 120a, 124a are made. It should be appreciated that any suitable materials and method of attaching the magnets 106a, 108a to the respective connectors 120a, 124a may be used. Such attachment means for various materials may include grooved means, adhesive means, shrink-wrap tubing, hinged clips, metal clamps, threaded hardware, and the like, and/or a combination thereof. The magnets 106a, 108a may also be injection molded into the connectors 120a, 124a.

The connectors 120, 124, 120a, 124a may be made out of any suitable material for connection to the temple bars 100, 102. By way of non-limiting example, the connectors may be made out of rubber or another deformable substance such that the connectors may stretch, if needed, with engaged with the temple bars 100, 102. The connectors need not stretch, however. The connectors 120, 124, 120a, 124a may be sized such as to remain in place on the temple bars 100, 102 by friction once in place. The connectors may also be allowed to slide along the length of the temple bars 100, 102. The connectors need not be any particular shape. For example, the connectors may be formed in the shape illustrated in FIG. 6 or the connectors can be square or rectangular in shape.

Referring to FIG. 4, which applies to all embodiments, the wearer pivots one of the temple bars 100, 102 into the closed position during use. The wearer then positions the eyeglasses frame body 114 and the closed temple bar on one side of a material 110. The wearer then pivots the other temple bar into the closed position such that it is on the other side of the material 110. When the temple bars 100, 102 are closed, the magnet 106 aligns with the magnet 108. Although on either side of the material 110, the magnets 106, 108 are in attractive magnetic communication with each other. The attractive magnetic communication is strong enough to impart a gripping force on the material 110, thereby holding the eyeglasses 114 securely clasped to the material 110. The gripping force is at least substantial enough to keep the eyeglasses 114 in place on the material 110 during most normal activity. The magnets 106, 108 are also able to maintain this strength because the magnetic flux is not diminished by repeated use. It should be appreciated that either temple bar 100 or 102 may be pivoted into the closed position before the other and still be within the scope of the invention.

Referring to FIG. 8, the eyeglasses clasp 104 may also alternatively comprise an eyeglasses necklace 140 having a first and second end 141, 143 and a first magnet 142 attached to first end 141 and a second magnet 144 attached to second end 143. The necklace may also be a strap or other suitable configuration. The magnets 142, 144 magnetically attract to and are held in place by the magnets 106, 108 in the connectors 120, 122. The user may then remove the eyeglasses 114 and wear them around the neck or place them on another device for storage. In this way, the user has the option of attaching the removable necklace 140 should they have occasion to do so. The magnets 142, 144 may be attached to the necklace 140 by any suitable means. By way of non-limiting example, the magnets 142, 144 may be attached to the necklace 140 by adhesive or injection molding. The necklace 140 may also be made out of any suitable material. By way of non-limiting example, the necklace 140 may be made of metal, plastic, rubber, or neoprene.

The eyeglasses clasp 104 may also comprise a "kit" form that includes the connectors 120, 124, 120a, 124a with the magnets 106, 108, 106a, 108a respectively. Optionally, the kit may also include the necklace 140. The connectors 120, 124, 120a, 124a may then be attached to any suitable eyeglasses frame temple bars.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A removable magnetic clasp for eyeglasses, the eyeglasses having a right temple bar and a left temple bar pivotally attached to an eyeglasses frame body, the magnetic clasp comprising:

a first connector and a second connector;

a first magnet being positioned on the first connector and a second magnet being positioned on the second connector;

a channel extending through a portion of each connector, the channel being configured to so as to allow a temple bar to slide through the channel;

wherein the removable magnetic clasp when attached to eyeglasses allows for the first and second magnets to remain in attractive magnetic communication when the temple bars are closed but separated by clothing material, the attractive magnetic communication imparting a gripping force on the clothing material sufficient enough to substantially prevent relative movement between the temple bars and the clothing material.

2. The removable clasp of claim 1, wherein the magnets are attached to the connectors by attachment means, said attachment means comprising injection molding.

3. The removable clasp of claim 1, wherein the magnets are attached to the connectors by attachment means, said attachment means comprising grooves in the connectors.

4. The removable clasp of claim 1, wherein the magnets are attached to the connectors by attachment means, said attachment means comprising an adhesive.

5. The removable clasp of claim 1, wherein the magnets are attached to the connectors by attachment means, said attachment means comprising shrink-wrap tubing.

6. The removable clasp of claim 1, wherein the magnets are attached to the connectors by attachment means, said attachment means comprising hinged clips.

7. The removable clasp of claim 1, wherein the magnets are attached to the connectors by attachment means, said attachment means comprising metal clamps.

8. The removable clasp of claim 1, wherein the magnets are attached to the connectors by attachment means, said attachment means comprising threaded hardware.

9. The removable clasp of claim 1, wherein the connectors are formed from a deformable material.

10. The removable clasp of claim 1, wherein the shape of the magnets is circular.

11. The removable clasp of claim 1, wherein the shape of the magnets is square.

12. The removable clasp of claim 1, wherein the shape of the magnets is rectangular.

13. The removable clasp of claim 1, wherein the shape of the magnets is cylindrical.

14. The removable clap of claim 1, further comprising:
an eyeglass necklace having a first necklace magnet attached to a first end and a second necklace magnet attached to a second end;
wherein the first necklace magnet attaches to the first magnet on the first connector by attractive magnetic communication and the second necklace magnet attaches to the second magnet on the second connector by attractive magnetic communication.

15. The removable clasp of claim 14, wherein the necklace is formed from metal.

16. The removable clasp of claim 14, wherein the necklace is formed from plastic.

17. The removable clasp of claim 14, wherein the necklace is formed from neoprene.

18. A removable magnetic clasp for eyeglasses, the eyeglasses having a right temple bar and a left temple bar pivotally attached to an eyeglasses frame body, the magnetic clasp comprising:
a first connector and a second connector;
a first magnet being positioned on the first connector and a second magnet being positioned on the second connector;
a channel extending through a portion of each connector, the channel being configured to so as to allow a temple bar to slide through the channel;
an eyeglass necklace having a first necklace magnet attached to a first end and a second necklace magnet attached to a second end, wherein the first necklace magnet attaches to the first magnet on the first connector by attractive magnetic communication and the second necklace magnet attaches to the second magnet on the second connector by attractive magnetic communication;
wherein the removable magnetic clasp when attached to eyeglasses allows for the first and second magnets to remain in attractive magnetic communication when the temple bars are closed but separated by clothing material, the attractive magnetic communication imparting a gripping force on the clothing material sufficient enough to substantially prevent relative movement between the temple bars and the clothing material.

19. The removable clasp of claim 18, wherein the magnets are attached to the connectors by attachment means, said attachment means comprising grooves in the connectors.

20. The removable clasp of claim 18, wherein the magnets are attached to the connectors by attachment means, said attachment means comprising hinged clips.

21. The removable clasp of claim 18, wherein the connectors are formed from a deformable material.

22. The removable clasp of claim 18, wherein the shape of the magnets is circular.

23. The removable clasp of claim 18, wherein the shape of the magnets is cylindrical.

24. The removable clasp of claim 18, wherein the first and second necklace magnets are attached to the first and second necklace ends by adhesive.

25. A removable magnetic clasp eyeglasses kit, the kit comprising:
a first connector and a second connector, a first magnet being positioned on the first connector and a second magnet being positioned on the second connector, and a channel extending through a portion of each connector, the channel being configured to so as to allow a temple bar to slide through the channel;
wherein the removable magnetic clasp when attached to eyeglasses allows for the first and second magnets to remain in attractive magnetic communication when temple bars of the eyeglasses are closed but separated by clothing material, the attractive magnetic communication imparting a gripping force on the clothing material sufficient enough to substantially prevent relative movement between the temple bars and the clothing material.

26. The kit of claim 25, wherein the magnets are attached to the connectors by attachment means, said attachment means comprising an adhesive.

27. The kit of claim 25, wherein the magnets are attached to the connectors by attachment means, said attachment means comprising hinged clips.

28. The kit of claim 25 wherein the connectors are formed from a deformable material.

29. The kit of claim 25, wherein the shape of the magnets is circular.

30. The kit of claim 25, wherein the shape of the magnets is cylindrical.

31. The kit of claim 25, further including an eyeglass necklace having a first necklace magnet attached to a first end and a second necklace magnet attached to a second end; wherein the first necklace magnet attaches to the first magnet on the first connector by attractive magnetic communication and the second necklace magnet attaches to the second magnet on the second connector by attractive magnetic communication.

32. The kit of claim 31, wherein the necklace is formed from plastic.

33. The kit of claim 31, wherein the necklace is formed from rubber.

34. The kit of claim 31, wherein the first and second necklace magnets are attached to the first and second necklace ends by adhesive.

35. The kit of claim 31, wherein the first and second necklace magnets are attached to the first and second necklace ends by injection molding.

36. A removable magnetic clasp eyeglasses kit, the kit comprising:

a first connector and a second connector, a first magnet being positioned on the first connector and a second magnet being positioned on the second connector, and a channel extending through a portion of each connector, the channel being configured to so as to allow a temple bar to slide through the channel;

an eyeglass necklace having a first necklace magnet attached to a first end and a second necklace magnet attached to a second end; wherein the first necklace magnet attaches to the first magnet on the first connector by attractive magnetic communication and the second necklace magnet attaches to the second magnet on the second connector by attractive magnetic communication;

wherein the removable magnetic clasp when attached to eyeglasses allows for the first and second magnets to remain in attractive magnetic communication when temple bars of the eyeglasses are closed but separated by clothing material, the attractive magnetic communication imparting a gripping force on the clothing material sufficient enough to substantially prevent relative movement between the temple bars and the clothing material.

37. The kit of claim 36, wherein the magnets are attached to the connectors by attachment means, said attachment means comprising injection molding.

38. The kit of claim 36, wherein the connectors are formed from a deformable material.

39. The kit of claim 36, wherein the shape of the magnets is circular.

40. The kit of claim 36, wherein the shape of the magnets is cylindrical.

* * * * *